(12) United States Patent
Mizuno et al.

(10) Patent No.: US 6,589,685 B2
(45) Date of Patent: Jul. 8, 2003

(54) FUEL CELL ELECTRODE CATALYST SOLUTION AND PRODUCTION METHOD THEREFOR

(75) Inventors: Seiji Mizuno, Toyota (JP); Tatsuya Kawahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 101 days.

(21) Appl. No.: 09/810,279

(22) Filed: Mar. 19, 2001

(65) Prior Publication Data
US 2001/0024748 A1 Sep. 27, 2001

(30) Foreign Application Priority Data
Mar. 22, 2000 (JP) ........................................ 2000-079952

(51) Int. Cl.⁷ .................................................. H01M 4/86
(52) U.S. Cl. ............................ 429/44; 429/41; 429/42; 502/101; 106/31.92; 252/500; 252/512; 252/521.5
(58) Field of Search ............................... 429/41, 42, 44; 427/115; 502/101; 252/500, 512, 521.5; 106/31.92

(56) References Cited

U.S. PATENT DOCUMENTS

| | | | | |
|---|---|---|---|---|
| 3,932,197 A | * | 1/1976 | Katz et al. ................... | 204/294 |
| 3,979,227 A | * | 9/1976 | Katz et al. ................... | 427/115 |
| 5,399,184 A | * | 3/1995 | Harada ........................ | 427/115 |
| 6,156,449 A | * | 12/2000 | Zuber et al. ................... | 429/44 |
| 6,309,772 B1 | * | 10/2001 | Zuber et al. ................... | 429/44 |
| 6,391,487 B1 | * | 5/2002 | Totsuka ....................... | 429/41 |

FOREIGN PATENT DOCUMENTS

| | | |
|---|---|---|
| JP | 06-13085 | 1/1994 |
| JP | 07-183035 | 7/1995 |
| WO | WO 94/25993 | 11/1994 |

* cited by examiner

Primary Examiner—Bruce F. Bell
(74) Attorney, Agent, or Firm—Kenyon & Kenyon

(57) ABSTRACT

The invention improves operability in forming a catalyst electrode, and improves performance of a fuel cell. A catalyst-loaded carbon is dispersed in a mixed solution of an azeotropic solvent and ion exchanged water. An electrolyte solution is added to the dispersed solution. A solvent, such as ethanol or the like, is added to adjust the viscosity and the water content of the solution, thereby providing an electrode catalyst solution. The use of the obtained solution as an ink for forming a catalyst layer through printing improves printing characteristic and drying characteristic.

8 Claims, 1 Drawing Sheet

FUEL CELL ELECTRODE CATALYST SOLUTION AND PRODUCTION METHOD THEREFOR

INCORPORATION BY REFERENCE

The disclosure of Japanese Patent Application No. 2000-079952 filed on Mar. 22, 2000, including the specification, drawings and abstract is incorporated herein by reference in its entirety.

BACKGROUND OF THE INVENTION

1. Field of the Invention

The invention relates to an electrode catalyst solution for a fuel cell, and a production method for the electrode catalyst solution. More particularly, the invention relates to an electrode catalyst solution for use for forming an electrode of a polymer electrolyte fuel cell, and a production method for the electrode catalyst solution.

2. Description of the Related Art

Electrode catalyst solutions for fuel cells for being applied or coated to electrolyte films have been proposed (e.g., in WO94/25993). Such a solution is prepared by using 2.6 mg of perfluorinated sulfonic acid NAFION solution (5 wt % of NAFION (registered trademark)) polymer, 50 wt % of isopropyl alcohol, 25 wt % of methanol, and 20 wt % of water), 390 mg of 1-methoxy 2-propanol, 2 ml of isopropanol, and 487.9 mg of a catalyst having 20 wt % of platinum supported on VULCAN (registered trademark) carbon (produced by Precious Metals Corporation).

In this electrode catalyst solution, however, since the catalyst-loaded carbon is dispersed in a solution containing great amounts of quick drying solvents, heat generation or a catalyst sink ring often occurs at the time of dispersion in many cases. Therefore, the operability in the preparation of the solution or the mass-productivity thereof decreases, or the catalyst electrode formed therefrom has degraded performance. As a countermeasure against the heat generation at the time of dispersion of the catalyst-loaded carbon, a technique of dispersing the catalyst-loaded carbon in water is possible. In this case, however, the dry shrinkage of the solution after being printed onto an electrolyte film or the like is great, so that cracks and the like are formed in the catalyst layer. Thus, it is difficult to form a uniform catalyst layer.

SUMMARY OF THE INVENTION

Accordingly, it is an object of the invention to provide an electrode catalyst solution that forms a uniform catalyst layer and forms a high-performance catalyst electrode. It is another object to improve the operability in the formation of an electrode catalyst.

To achieve the aforementioned objects, an electrode catalyst solution for use for forming an electrode of a polymer electrolyte fuel cell in accordance with the invention is prepared by (a) mixing a water and a solvent which, when alone, has a higher boiling point than the water, and which, in an aqueous solution, boils together with the water at a predetermined temperature, and (b) dispersing a catalyst-loaded carbon powder in the obtained solution.

Therefore, it becomes possible to prevent ignition of the catalyst-loaded carbon powder caused by heat generated at the time of dispersing the carbon powder. Furthermore, since the azeotropic solvent boils together with water, the solvent evaporates together with water at the time of forming a catalyst electrode, and does not remain as a residue. As a result, high performance of the catalyst electrode formed by using the solution can be maintained.

DETAILED DESCRIPTION OF PREFERRED EMBODIMENT

Figure 1:
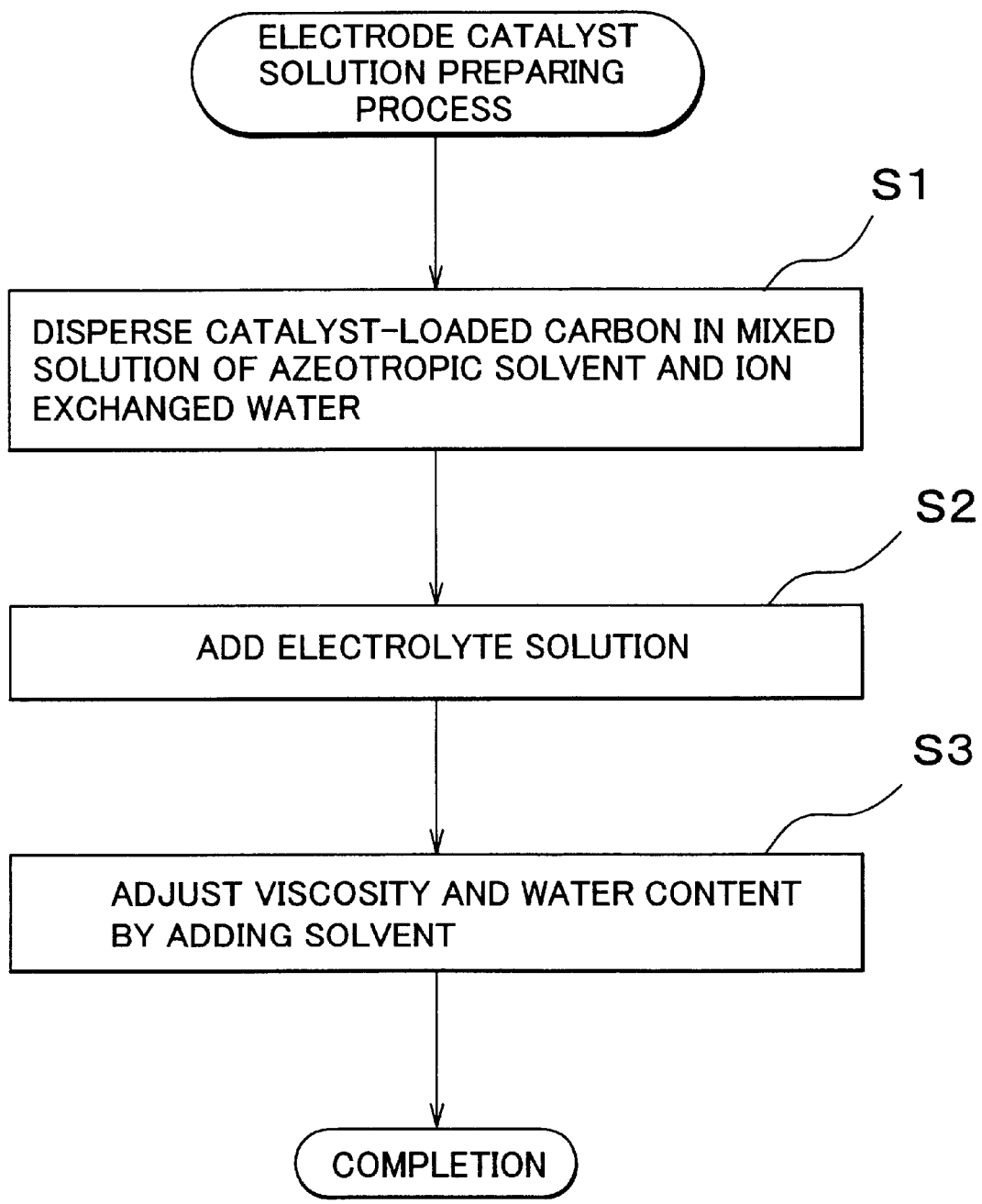
FIG. 1 is a process chart exemplifying a process of preparing an electrode catalyst solution in accordance wit the invention.

A preferred embodiment of the invention will be described hereinafter with reference to the accompanying drawings. FIG. 1 is a process chart exemplifying a process of preparing an electrode catalyst solution in accordance wit the invention. The preparation method in this embodiment starts with a step (step S1) of dispersing a catalyst-loaded carbon in a mixed solution of an azeotropic solvent and ion-exchanged water (i.e., an aqueous solution of the azeotropic solvent). As the catalyst-loaded carbon, a carbon powder loaded with platinum, as a catalyst, at a proportion of 10–60 wt % (% by weight) may be suitably used. As the azeotropic solvent, it is possible to use a solvent which, in the form of an aqueous solution, boils together with water at or below 130° C., for example, a polyalcohol (ethylene glycol, propylene glycol, glycerine, or the like). Particularly preferred is a solvent having a relative dielectric constant of 20–50. As the mixed solution of the azeotropic solvent and ion-exchanged water, a 10–60 wt % aqueous solution of the azeotropic solvent may be suitably used. By dispersing the catalyst-loaded carbon in the azeotropic solvent aqueous solution in this manner, it is possible to prevent heat generation or ignition, which is likely to occur at the time of dispersing a catalyst-loaded carbon in a solvent according to the conventional art.

Subsequently, an electrolyte solution is added to the solution obtained in step S1 (step S2). As the electrolyte solution, it is possible to use a solution prepared mainly from a solid polymer electrolyte (e.g., a perfluorosulfonic acid type polymer), water, ethanol, and 1-isopropanol. The amount of the electrolyte solution added may be within the range of 1:0.5 to 1:2 in terms of the weight ratio of the solid content of the electrolyte to the carrier carbon of the catalyst-loaded carbon (electrolyte solid content:carrier carbon).

Then, the viscosity and the water content of the solution is adjusted by adding a solvent thereto (step S3), thereby completing the preparation of the electrode catalyst solution. The solvent used herein to adjust the viscosity and the water content may be an alcohol or the like, such as ethanol, isopropanol, etc. The adjusted viscosity is preferably 30–200 cps. The final water content in a catalyst ink solvent is smaller than or to 50%, preferably 10–30%.

A specific example of the electrode catalyst solution prepared as described above will be presented below together with the steps illustrated in FIG. 1.

(Step S1)

A 40% platinum-loaded carbon was dispersed in a 30% propylene glycol aqueous solution at a proportion of 1:4 (catalyst-loaded carbon:propylene glycol aqueous solution) in terms of weight ratio.

(Step S2)

A 20% electrolyte solution was added to the dispersed solution obtained in step S1 at a proportion of 1:1 (solid content of the electrolyte: carrier carbon) in terms of weight ratio to the carrier carbon of the 40% platinum-loaded carbon.

(Step S3)

Ethanol was added, as a solvent for adjusting the viscosity and the water content, to the solution containing the electrolyte solution at a proportion of 2:1 (ethanol:catalyst-loaded carbon in terms of weight ratio to the 40% platinum-loaded carbon).

Using the thus-prepared electrode catalyst solution as an ink, printing was performed. As a result, the ink exhibited a better printing property than an ink that was prepared in a similar manner but without using propylene glycol. The coated film did not have cracking or peeling at the time of drying, and a good drying property was exhibited. Furthermore, the catalyst layer formed by printing through the use of the electrode catalyst solution as an ink was transferred to a solid polymer electrolyte film by hot-pressing the catalyst layer together with the solid polymer electrolyte film cut into a predetermined shape, at a temperature of 100–130° C. (preferably, 120° C.) and a face pressure of 20–100 $kg/cm^2$ (preferably, 50–100 $kg/cm^2$). As a result, a good transfer property was exhibited. Still further, using the solid polymer electrolyte film with the catalyst layer transferred thereto, a polymer electrolyte fuel cell was formed. The performance of the fuel cell was good.

According to the above-described embodiment, good printing property and good drying property can be obtained by using the electrode catalyst solution prepared as described above as an ink for forming a catalyst layer through printing. That is, a uniform and good catalyst layer can be formed. Furthermore, the electrode catalyst solution improves the property of the catalyst in transfer to a solid polymer electrolyte film, and improves the performance of a fuel cell.

Furthermore, according to the production method for an electrode catalyst solution of the embodiment, the heat generation or ignition at the time of dispersion can be curbed since the catalyst-loaded carbon is dispersed in the azeotropic solvent. Still further, the method makes it possible to produce an electrode catalyst solution having a better printing property and a better drying property than an electrode catalyst solution prepared by dispersing a catalyst-loaded carbon without using an azeotropic solvent.

The dispersed solution obtained in step S1 in FIG. 1 may also be used as an ink for forming a catalyst layer through printing. Furthermore, the solution obtained in step S2 may also be used as an ink.

While the invention has been described with reference to what is presently considered to be a preferred embodiment thereof, it is to be understood that the invention is not limited to the disclosed embodiment or example. On the contrary, the invention may be carried out in various forms without departing from the gist of the invention.

What is claimed is:

1. A production method for an electrode catalyst solution for use for forming an electrode of a solid polymer fuel cell, comprising:
    (a) mixing a water and a solvent which, when alone, has a higher boiling point than the water and which, when in an aqueous solution, said solution is azeotropic; and
    (b) dispersing a catalyst-loaded carbon powder in a solution obtained in the step (a).

2. A method according to claim 1, wherein the solvent is a polyalcohol.

3. A method according to claim 1, wherein a relative dielectric constant of a solution obtained in the step (a) is within a range of 20 to 50.

4. A method according to claim 1, wherein a solution obtained in the step (a) is a 10–60% aqueous solution.

5. The method according to claim 1, further comprising
    (c) adding an electrolyte solution containing a solid polymer electrolyte to a solution obtained in the step (a),
    wherein a weight ratio of the solid content of the electrolyte to a carbon of the catalyst-loaded carbon powder is within a range of 1:0.5 to 1:2.

6. A method according to claim 5, wherein the solid polymer electrolyte is a perfluorosulfonic acid polymer.

7. A method according to claim 5, further comprising
    (d) adding a viscosity adjusting solvent to a solution obtained in the step (c),
    wherein a solution obtained in the step (d) has a viscosity of 30–200 cps and a water content which is smaller than or equal to 50%.

8. An electrode catalyst solution prepared by a method described in claim 1.

* * * * *